Patented Nov. 16, 1937

2,099,525

UNITED STATES PATENT OFFICE 2,099,525

PRODUCTION OF WATER-SOLUBLE AZO DYESTUFFS

Hans Krzikalla, Heinrich Dehnert, and Dieter Vossen, Ludwigshafen-on-the-Rhine, Germany, assignors to General Aniline Works, Inc., New York, N. Y., a corporation of Delaware No Drawing. Application February 4, 1936, Serial No. 62,376. In Germany February 19, 1935

14 Claims. (Cl. 260—96)

The present invention relates to water-soluble azo dyestuffs and a process of making them.

We have found that valuable water-soluble azo dyestuffs are obtained by coupling aromatic amines of the general formula:

(in which R is an aromatic radicle capable of coupling, X is an alkyl, aryl, aralkyl or cycloalkyl group and Y is an ankyl radicle to which is attached indirect combination with an alkyl carbon atom a quaternary nitrogen atom, such as the nitrogen atom of the residue of a quaternary ammonium base or a quarternary ammonium salt, or in which X is the same as Y) with diazotized aromatic amines.

Amines of the above mentioned general formula are obtainable for example from aromatic compounds containing a chloralkyl group attached to a tertiary nitrogen atom by reaction with pyridine, quinoline, trimethylamine, triethanolamine or the like and usually constitute well crystallizing, readily water-soluble and weakly basic substances. The dyestuffs obtainable therefrom by coupling with diazotized aromatic amines, as for example aniline, phenylene diamines, benzidine, naphthylamines or their homologues or derivatives are suitable for dyeing a great variety of materials. Dyestuffs of this kind which contain a diazotizable amino group, may be converted into disazo dyestuffs by diazotizing and coupling with coupling components.

The following examples will further illustrate, how the said invention may be carried out in practice but the invention is not restricted to these examples. The parts are by weight.

Example 1

138 parts of 1-amino-4-nitro-benzene are diazotized in the usual manner and coupled with an aqueous solution of 307 parts of the reaction product of pyridine with N-normal-butyl-omegachlorethylbenzene

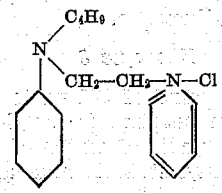

(obtainable by reacting N-butyl-N-chlorethylaminobenzene with pyridine). The resulting dyestuff is thereby precipitated and after filtration by suction it is washed with common salt solution until neutral. It dyes cotton, viscose artificial silk or mixed fabrics, leather and paper brilliant red shades.

Similar dyestuffs are obtained by coupling the compound obtainable from pyridine and N-butyl-N-chlorethylaminobenzene with the following diazo compounds:

| | Shade of color |
|---|---|
| 1-amino-2-chlor-4-nitrobenzene | Dark red |
| 1-amino-2-nitro-4-chlorbenzene | Orange |
| 1-amino-2,6-dichlor-4-nitrobenzene | Red orange |
| 1-amino-2,4,5-trichlorbenzene | Orange |
| 1-amino-2,4,6-trichlorbenzene | Yellow |
| 1-amino-2-methoxy-5-nitrobenzene | Red |
| 4,4'-diamino-3,3'-dimethoxydiphenyl | Pale brown |
| 1-methyl-2-aminobenzene-4-sulphonic acid | Pale yellow |
| 1-amino-3,6-dimethoxy-5-nitrobenzene | Red |
| 1-amino-2,3,5,6-tetrachlorbenzene | Pale yellow |
| 1-amino-2,4-dinitrobenzene | Red |
| 1-amino-6-bromo-2,4-dinitrobenzene | Bordeaux red |

Example 2

138 parts of 1-amino-4-nitrobenzene are diazotized in the usual manner and coupled with an aqueous solution of 300 parts of the compound

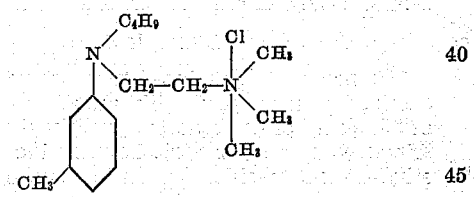

(obtainable from trimethylamine and 1-methyl-3-(N-butyl-N-omegachlorethyl)-aminobenzene) to which have been added 272 parts of crystallized sodium acetate. The resulting dyestuff may be directly filtered off by suction and dyes a great variety of materials red shades fast to light.

Similar dyestuffs are obtained from the compound of the above formula by coupling with the following compounds:

| | Shade of color |
|---|---|
| 1-amino-2,4,6-trichlorbenzene | Yellow |
| 1-amino-2,3,5,6-tetrachlorbenzene | Pale yellow |
| 1-amino-2,4-dinitrobenzene | Red-violet |
| 1-amino-2-chlor-4-nitrobenzene | Dark red |
| 1-amino-2,6-dichlor-4-nitrobenzene | Brown-red |
| 1-amino-2,4,5-trichlorbenzene | Orange |
| 1-amino-6-bromo-2,4-dinitrobenzene | Violet |

Example 3

138 parts of 1-amino-4-nitrobenzene are diazotized in the usual manner and coupled with an aqueous solution of 330 parts of the compound

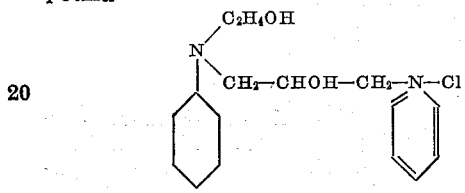

(obtainable from pyridine and N-hydroxyethyl-N-(beta-hydroxy-gamma-chlorpropyl)-aminobenzene) to which have been added 212 parts of calcined sodium carbonate. The resulting dyestuff dyes a great variety of materials powerful red shades.

Example 4

196 parts of 1-amino-2,4,6-trichlorbenzene are diazotized and coupled with 300 parts of the compound

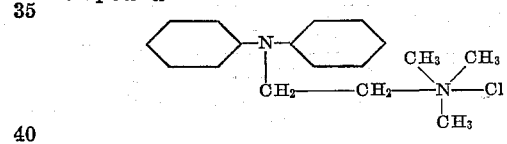

(derived from trimethylamine and N-omega-chlorethyldiphenylamine) in 10,000 parts of water. The solution is then almost neutralized with sodium acetate and the precipitated dyestuff filtered off by suction. It dyes viscose artificial silk and leather beautiful green-yellow shades. Especially deep shades are obtained (as also with the dyestuffs already specified) in leather which has been prepared with synthetic tanning agents containing sulphonic groups.

Similar valuable dyestuffs are obtained with the following diazotized amines:

| | Shade of color |
|---|---|
| 1-amino-2,4-dinitrobenzene | Red |
| 1-amino-4-nitrobenzene | Pale red |
| 1-amino-2-chlor-4-nitrobenzene | Brown-red |
| 1-amino-2,6-dichlor-4-nitrobenzene | Brown |
| 1-amino-2,4,5-trichlorbenzene | Yellow |

Example 5

138 parts of 1-amino-4-nitrobenzene are diazotized and coupled with an aqueous solution of 250 parts of the reaction product derived from trimethylamine or triethanolamine and N-ethyl-N-omega-chlorethylaminobenzene, viz:—

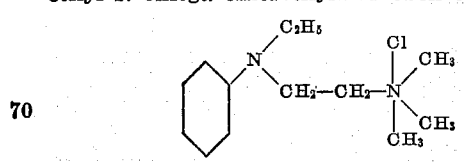

to which sodium acetate has been added. The resulting dyestuff dyes a great variety of materials brilliant orange-red shades. (By employing the reaction product derived from triethanolamine and N-hydroxyethyl-N-omega-chlorethylaminobenzene, a similar dyestuff is obtained.)

In a similar manner dyestuffs having good properties as regards fastness are obtained by coupling the compound prepared from trimethylamine or triethanolamine and N-ethyl-N-omega-chlorethyl-aminobenzene with the following diazotized amines:—

| | Shades of color |
|---|---|
| 1-amino-2,4,6-trichlorbenzene | Yellow |
| 1-amino-2,4,5-trichlorbenzene | Yellow |
| 1-amino-2,3,5,6-tetrachlorbenzene | Green-yellow |
| 1-amino-2,6-dichlor-4-nitrobenzene | Red-brown |
| 1-amino-2,4-dinitrobenzene | Red |
| 1-amino-6-bromo-2,4-dinitrobenzene | Blue-red |
| 4-amino-azo-toluene | Red |
| 1-amino-naphthalene | Yellow |
| 4-nitro-4'-amino-azo-benzene | Red |

Dyestuffs of this kind are also soluble in nitrocellulose lacquers.

Example 6

By coupling 1-amino-4-nitrobenzene with the reaction product derived from two molecular proportions of trimethylamine with 1 molecular proportion of N-di-(chlorethyl)-aniline and having the formula:

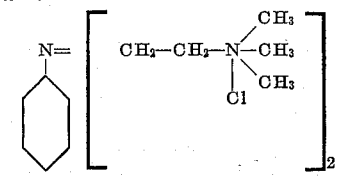

a dyestuff is obtained which is especially readily soluble. It dyes vegetable fibres and, in particular, also leather tanned with synthetic tanning agents yellowish orange shades.

If 4-nitro-1-naphthylamine be employed instead of 1-amino-4-nitrobenzene, a Bordeaux red dyeing is obtained on leather and viscose artificial silk, while 1-naphthylamine yields orange dyeings.

Example 7

The diazo compound of 262 parts of 1-amino-2,4-dinitro-6-brombenzene is coupled with the reaction product derived from trimethylamine and N-ethyl-N-omega-chlorethyl-1-aminonaphthalene and having the formula:

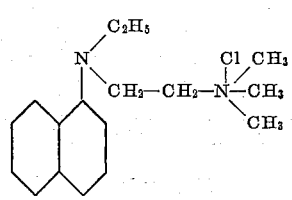

The dyestuff thus formed dyes leather bluish violet shades.

A dyestuff having similar properties is obtained by coupling the same diazo compound with the reaction product derived from trimethylamine and N-butyl-N-omega-chlorethyl-1-amino-2-methoxy-5-methylbenzene.

Example 8

The diazo compound of 231 parts of 2, 3, 5, 6-tetrachlor-1-aminobenzene is coupled with the solution in 12000 parts of water of the reaction product of dimethyl-stearylamine and N-ethyl- N-chlorethylaminobenzene. The solution is then neutralized with sodium acetate and the dyestuff precipitated is filtered off by suction. It dyes chrome-tanned leather which has been treated with synthetic tanning agents containing sulphonic groups yellow brown shades.

*Example 9*

153 parts of 1,3-diamino-4-nitrobenzene are monodiazotized in the known manner and the diazo compound obtained is coupled with 238 parts of the reaction product derived from trimethylamine and N-ethyl-N-omega-chlorethylaminobenzene. After having finished the first coupling reaction the resulting monoazo dyestuff is diazotized for the second time, coupled with 112 parts of dihydro-resorcin and the disazo dyestuff formed is filtered off by suction. It dyes chrome-tanned leather which has been treated with synthetic tanning agents containing sulphonic acid groups, strong brown shades.

*Example 10*

231 parts of 2,3,5,6-tetrachlor-1-aminobenzene are diazotized and coupled with 300.5 parts of the reaction product derived from trimethylamine and N-butyl-N-(beta-hydroxy-gamma-chlorpropyl)-aminobenzene. The dyestuff obtained dyes leather which has been prepared with synthetic tanning agents containing sulphonic acid groups deep yellow shades.

Similar valuable dyestuffs are obtained when employing instead of 2,3,5,6-tetrachlor-1-aminobenzene the following amines as diazo components:

| | Shade of color |
|---|---|
| 1-amino-2,6-dichlor-4-nitrobenzene | Red brown |
| 1-amino-2,4,5-trichlorbenzene | Orange |
| 1-amino-2,4,6-trichlorbenzene | Yellow |
| 1-amino-4-nitrobenzene | Red |

Dyestuffs of this kind are also soluble in nitrocellulose lacquers and organic solvents.

When employing the reaction product derived from trimethylamine and N-ethyl-N-(beta-hydroxy-gamma-chlorpropyl)-aminobenzene as coupling component similar dyestuffs are obtained.

*Example 11*

The diazo solution of 231 parts of 2,3,5,6-tetrachlor-1-aminobenzene is coupled with 296.5 parts of the reaction product derived from trimethylamine and N-cyclohexyl-N-omega-chlorethylaminobenzene. The dyestuff thus obtained yields brilliant yellow shades on different materials.

*Example 12*

153 parts of 4-nitro-1,3-diaminobenzene are monodiazotized and coupled with 396 parts of the reaction product derived from 2 molecular proportions of trimethylamine and 1 molecular proportion of N-di-(beta-hydroxy-gamma-chlorpropyl)-aminobenzene of the formula

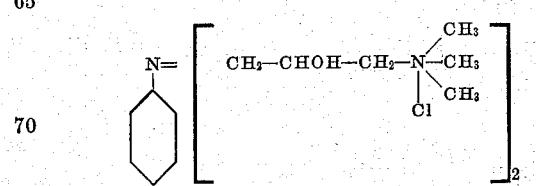

After having finished the first coupling process the resulting monoazo dyestuff is diazotized for a second time and coupled with 112 parts of dihydro-resorcin. The disazo dyestuff obtained is readily soluble in water and dyes leather which has been prepared with synthetic-tanning agents containing sulphonic acid groups very fast brown shades.

What we claim is:

1. A process for the production of water-soluble azo dyestuffs which consists in coupling aromatic amines of the general formula

wherein R is an aromatic radicle capable of being coupled, and at least one X stands for an alkyl radicle to which is attached in direct combination with an alkyl carbon atom a quaternary nitrogen atom, the other X being a member of the group consisting of alkyl, cycloalkyl, aralkyl and aryl, with diazotized aromatic amines.

2. A process for the production of water-soluble azo dyestuffs which consists in coupling aromatic amines of the general formula

wherein R is an aromatic radicle capable of being coupled, and one X stands for an alkyl radicle to which is attached in direct combination with an alkyl carbon atom a quaternary nitrogen atom of a residue derived from the group of trialkylammonium bases and ammonium salts, the other X being a member of the group consisting of alkyl, cycloalkyl, aralkyl and aryl, with diazotized aromatic amines.

3. A process for the production of water-soluble azo dyestuffs which consists in coupling aromatic amines of the general formula

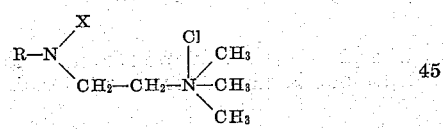

wherein R is an aromatic radicle capable of being coupled and X stands for a member of the group consisting of alkyl, cycloalkyl, aralkyl and aryl, with diazotized aromatic amines.

4. A process for the production of water-soluble azo dyestuffs which consists in coupling aromatic amines of the general formula

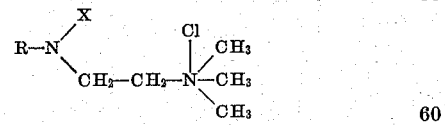

wherein R is an aromatic radicle capable of being coupled and X stands for alkyl, with diazotized aromatic amines.

5. A process for the production of water-soluble azo dyestuffs which consists in coupling aromatic amines of the general formula

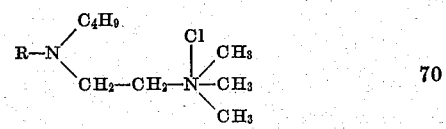

wherein R is an aromatic radicle capable of being coupled, with diazotized aromatic amines.

6. The process for the production of a water-soluble azo dyestuff which consists in coupling an amine of the formula

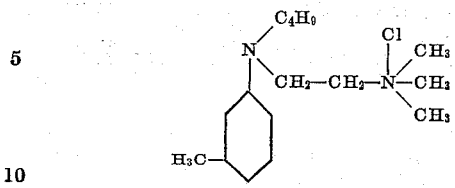

with diazotized 2,3,5,6-tetrachlor-1-aminobenzene.

7. The process for the production of a water-soluble azo dyestuff which consists in coupling an amine of the formula

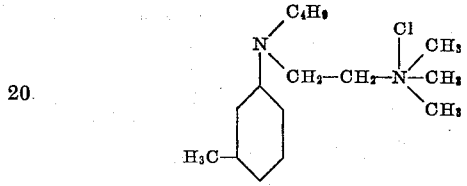

with diazotized 2,4,5-trichlor-1-aminobenzene.

8. The process for the production of a water-soluble azo dyestuff which consists in coupling an amine of the formula

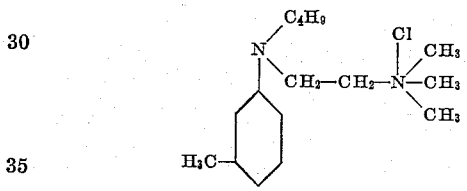

with diazotized 1-amino-2,6-dichlor-4-nitrobenzene.

9. Azo dyestuffs corresponding to the general formula

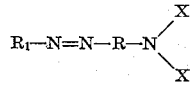

wherein $R_1$ and R stand for aryl radicles and at least one X stands for an alkyl radicle to which is attached in direct combination with an alkyl carbon atom a quaternary nitrogen atom, the other X being a member of the group consisting of alkyl, cycloalkyl, aralkyl and aryl.

10. Azo dyestuffs of the general formula

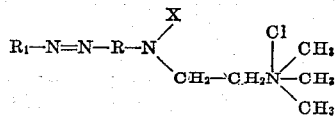

wherein $R_1$ and R stand for aryl radicals and X stands for an alkyl group.

11. Azo dyestuffs of the general formula

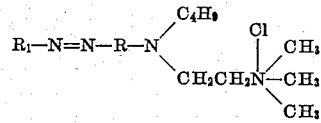

wherein $R_1$ and R stand for aryl radicals.

12. Azo dyestuff corresponding to the formula

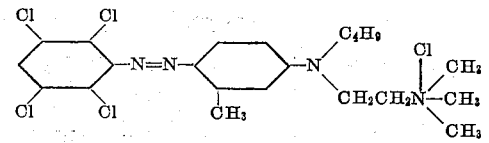

13. Azo dyestuff corresponding to the formula

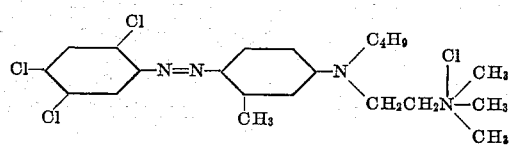

14. Azo dyestuff corresponding to the formula

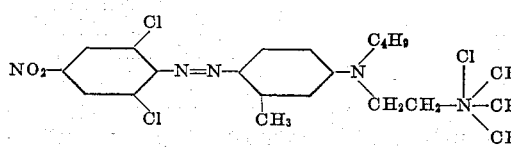

HANS KRZIKALLA.
HEINRICH DEHNERT.
DIETER VOSSEN.